D. W. McINTOSH.
VETERINARY TABLE.
APPLICATION FILED JUNE 1, 1915.

1,202,751.

Patented Oct. 24, 1916.
2 SHEETS—SHEET 1.

Witnesses

Inventor
D. W. McIntosh,
By
Attorney

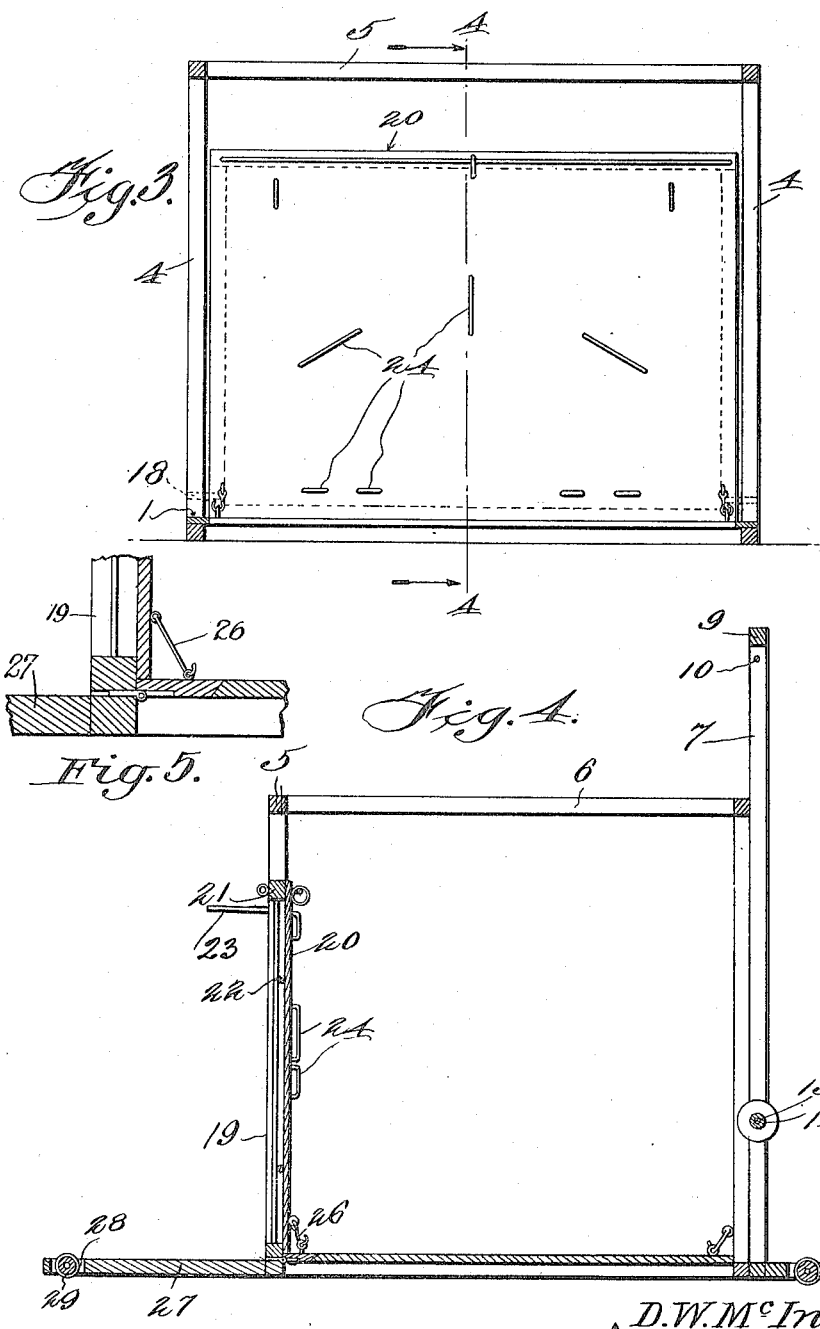

UNITED STATES PATENT OFFICE.

DANNIE W. McINTOSH, OF WISNER, MISSISSIPPI.

VETERINARY TABLE.

1,202,751.      Specification of Letters Patent.      Patented Oct. 24, 1916.

Application filed June 1, 1915. Serial No. 31,566.

*To all whom it may concern:*

Be it known that I, DANNIE W. McINTOSH, a citizen of the United States, residing at Wisner, in the county of Smith and State of Mississippi, have invented certain new and useful Improvements in Veterinary Tables; and I do hereby declare the following to be a full, clear, and exact description of the invention, such as will enable others skilled in the art to which it appertains to make and use the same.

This invention relates to veterinary tables and the principal object of the invention is to provide a device upon which an animal may be supported in order the same may be given treatment.

Another object of the invention is to provide a table which is so arranged as to permit the animal to be strapped thereon so that the table may be lowered into a position for operation.

A further object of the invention is to provide a table comprising a frame provided with a pair of uprights between which the platform is pivoted and to provide means for raising and lowering the free edge of the platform so that the same may be thrown to a vertical position and the horse driven into the frame whereupon he is secured to the table by a suitable strap and the table may then be lowered to a horizontal position so that the animal may be properly treated.

With these and other objects in view, the invention consists in the novel combination and arrangement of parts which will be fully set forth in the following specification and accompanying drawings, in which:—

Figure 1:
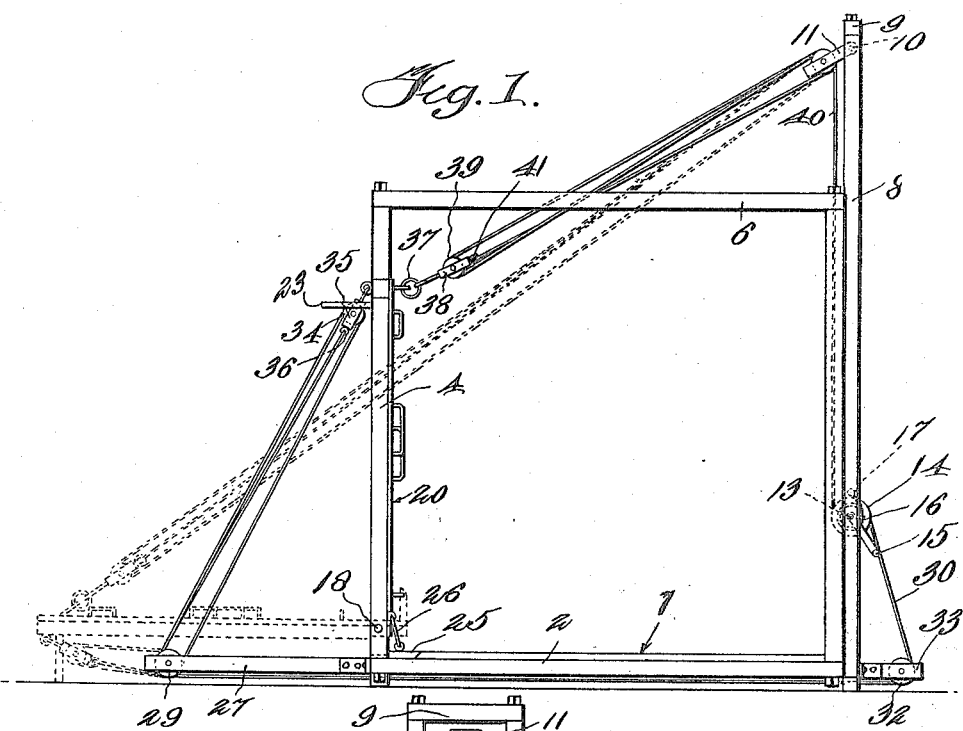
Figure 2:
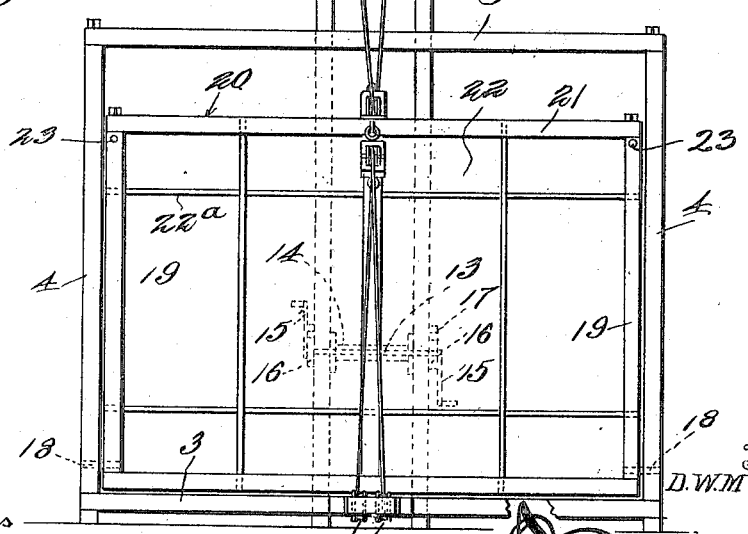

Figure 1 is an end view in elevation of a table constructed in accordance with this invention. Fig. 2 is a side view showing the table in a raised position. Fig. 3 is a side view showing the table in a raised position and from the opposite side to Fig. 2, and Fig. 4 is a transverse sectional view on line 4—4 of Fig. 3. Fig. 5 is an enlarged detail sectional view showing the support hinged to the table.

Referring now to the drawings by characters of reference the numeral 1 designates the platform of the device supported by the rectangular frame which comprises the end bars 2, the ends of which are connected together by means of the side bars 3, thus forming a rectangular frame. Extending upwardly from the corners of the frame are the standards 4 the upper ends of which are connected by the side bars 5 and end bars 6. Secured to one of the side bars 3 and one of the side bars 5 are the uprights 7 and 8 which are in parallel relation and project above the bars 5. The upper terminals of the bars 7 and 8 are connected by means of the connecting bar 9 and secured in the uprights near the bar 9 is a suitable rod 10, on which the block 11 is formed. This block 11 is provided with a pair of sheaves 12, the use of which will appear as the description proceeds. Mounted between the lower ends of the standard and spaced upwardly from the bar 3 is a suitable shaft 13 carrying the winding drum. This shaft 13 extends through the uprights 7 and 8 and is provided at each end with suitable cranks 15 by which the frame is turned. Carried on the shafts are the ratchet wheels 16 with which the pawls 17 are designed to hold the winding drum against rotation in one direction. These pawls are disposed oppositely so that when one of the pawls is in engagement with the ratchet wheel, the drum may turn in one direction and when the opposite pawl is in engagement and the first mentioned pawl out of engagement, the drum may be turned to the opposite direction. It will thus be seen that when both pawls are in engagement with their respective ratchet wheels, the drum will be held against movement.

Extending through two of the standards 4 on the side of the frame opposite the uprights 7 and 8 are suitable pivot pins or bolts 18, the inner ends of which project through the end bars 19 of the table designated generally by the numeral 20. This table or platform 20 comprises the end bars 19 which are connected by the side bars 21 and a suitable floor 22. Extending beneath the floor are the reinforcing bars 22$^a$ which strengthen and reinforce the table or platform. Extending downwardly from the bars 19 near their ends opposite the pivot are suitable lugs or supports 23, which are arranged to coöperate with the pivot in holding the table or platform horizontal, when the same is in its completely lowered position.

Carried by the table are suitable straps 24 and a support designated by the numeral 25 comprising a strip of material which is hinged thereto and is normally held in the position illustrated in Fig. 1 by means of suitable hooks 26. This hinged support may be removed or swung downwardly when the table is in the horizontal position so as to allow the horse to be shod.

Extending laterally from the frame or platform 1 is a suitable bar 27, the free end of which is slotted as at 28 and carries the sheave 29, which is rotatably mounted in the slot and forms a guide for the rope or flexible member which will be more fully hereinafter described.

The flexible member hereinbefore referred to, which passes over the sheave 29, is designated by the numeral 30 and one end thereof is secured to the winding drum 14, while the opposite end passes over the sheave 32 carried by the extension 33 and over the sheave 29 carried by the arm 27. This flexible member then passes upwardly over a suitable sheave 34 carried on the block 35 which is secured to the free edge of the table or platform 20 and this flexible member then continues downwardly over a sheave extending parallel to the sheave 29 and thence upwardly over said sheave and is connected as at 36 to the block 35. Secured to the upper side of the platform or table 20 is a suitable ring 37, having attached thereto the block 38 in which the sheave 39 is rotatably mounted. The flexible member 40 is connected at one end to the winding drum 14 and passes over one of the sheaves 12 in the block 11 and thence over the sheave 39 to the opposite sheave 12 and the terminal of the flexible member 40 opposite the one which is connected to the drum 14 is secured in the eyelets 41 carried on the block 38. It will thus be seen that when the winding drum is turned in one direction the flexible member 30 will be wound thereon and when turned in the opposite direction, the flexible member 40 will be wound thereon, while the flexible member 30 is unwound. It will thus be seen that the turning of the drum will cause the table or platform 20 to swing on its pivots, either into the position shown in the full lines in Fig. 1 or in the dotted line so that after the animal has been secured to the platform, he may be lowered to a horizontal position allowing the desired treatment to be given. In event that the horse or animal is to be shod the hinged support 25 is lowered by releasing the hooks 26 and thus the hoof of the animal may be readily accessible.

While in the foregoing there has been shown and described the preferred embodiment of this invention, it is to be understood that such changes may be made in the combination and arrangement of parts as will fall within the spirit and scope of the appended claims.

What is claimed is:—

1. A device of the character described, including a frame, a platform supported by said frame, standards extending upwardly from said frame, a pair of uprights extending upwardly from the frame centrally of one pair of standards, a table pivoted between the opposite pair of standards, a winding drum mounted upon the uprights, a double block at the upper ends of the uprights, a block secured to the upper side of the table, a flexible member secured to the block on the table, the opposite end passing over the block secured to the uprights and back over the block on the table and then over the block secured on the uprights, and being secured to and wound upon the winding drum, a hinged support carried by the table and means for normally securing said support at right angles to said table, said support adapted to swing downwardly when the table is in a horizontal position to permit access to the hoof of an animal when shoeing or treating the same.

2. A device of the character described including a frame, a platform supported by said frame, standards extending upwardly from said frame, a pair of uprights extending upwardly from the frame centrally of one pair of standards, a table pivoted between the opposite pair of standards, a winding drum mounted between the uprights, a double block at the upper ends of the uprights, a block secured to the upper side of the table, a flexible member secured to the block on the table, the opposite end passing over the block secured to the uprights and back over the block on the table and then over the block secured on the uprights and being secured to and wound upon the winding drum, a hinged support carried by the lower end of the table, said support adapted to fit against and in alinement with the platform when the table is in a vertical position, and means for normally securing said support at right angles to the table.

3. A device of the character described including a frame, standards extending upwardly therefrom, a pair of uprights extending upwardly from the frame centrally of one pair of standards, a table pivoted between the opposite pair of standards, a winding drum mounted between the uprights, a double block at the upper ends of the uprights, a block secured to the upper side of the table, a block secured to the lower side of the table, a bar extending laterally from one side of the frame, a lateral extension formed at the opposite side of the frame, sheaves mounted in said bar and extension, and a pair of flexible members secured to the blocks on the table, the opposite end of one of the flexible members passing over the block secured to the uprights and being secured to and wound upon the winding drum, the opposite end of the other of said flexible members passing over the sheaves mounted on the bar and extension and being secured to and wound upon the winding drum, whereby upon rotation of the winding drum the table will be raised or lowered.

In testimony whereof I affix my signature in presence of two witnesses.

DANNIE W. McINTOSH.

Witnesses:
V. J. FORD,
F. B. KELLY.

Copies of this patent may be obtained for five cents each, by addressing the "Commissioner of Patents, Washington, D. C."